SIGNALLING SYSTEMS

Filed Feb. 13, 1961 5 Sheets-Sheet 1

INVENTOR.
Johannes Rode
BY

SIGNALLING SYSTEMS

Filed Feb. 13, 1961 5 Sheets-Sheet 2

INVENTOR.
Johannes Rode
BY
Hermann Salzer Atty.

SIGNALLING SYSTEMS

Filed Feb. 13, 1961

INVENTOR.
Johannes Rode
BY Erwin Salzer Atty.

INVENTOR.
Johannes Rode
BY

April 7, 1964

J. RODE 3,128,416

SIGNALLING SYSTEMS

Filed Feb. 13, 1961

5 Sheets-Sheet 5

INVENTOR.

Johannes Rode

BY Erwin Salzer Atty.

United States Patent Office 3,128,416

Patented Apr. 7, 1964

3,128,416

SIGNALLING SYSTEMS

Johannes Rode, Hamburg-Rahlstedt, Germany, assignor to Telefonbau und Normalzeit G.m.b.H., Frankfurt am Main, Germany

Filed Feb. 13, 1961, Ser. No. 88,909
10 Claims. (Cl. 317—146)

This invention refers to electric signalling or alarm systems, and more particularly to electric signalling or alarm systems wherein a change in the electric parameters of a circuit causes the emission of a warning signal.

It is a general object of this invention to provide improved signalling systems of the aforementioned character.

It is possible to predicate the operation of signalling systems on the presence of two oscillators of which one is adapted to undergo a change of frequency, whereas the other supplies a constant frequency standard. Normally both oscillators are in tune and, therefore, have the same frequency. If a disturbance occurs which results in a change of the electric parameters, and more particularly in a change of the capacitance of the oscillatory circuit of one of the two oscillators, the frequency of that particular oscillator will change and in accordance therewith the difference between the frequency of that particular oscillator and the frequency of the frequency standard oscillator will change. The rate of change of the frequency of one of the oscillators, or the change of the beats resulting from the oscillations of both oscillators, are quantities indicative of the occurrence of an electric disturbance. These quantities may affect a CR circuit which, in turn, controls an on-off switching device for an electric alarm or warning signal. The changes of the charge of the capacitance C in said CR circuit result in corresponding voltage changes across the resistance R thereof. These latter changes may be used to provide the control bias for an electron tube. Such a control system calls for circuits having relatively large resistance values, and the control of the electron tube does not involve any appreciable power.

It is one object of the invention to provide signalling, alarm or warning systems predicated upon a change of frequency of a local oscillator, which systems are not limited to the use of switching elements, such as electron tubes, that do not require power for the control thereof or, in other words, to provide systems of the aforementioned character which lend themselves to the use of switching elements taking the place of the aforementioned electron tube and requiring power for the control thereof.

Transistors are switching elements requiring power for the control thereof.

It is another object of this invention to provide signalling, alarm or warning systems predicated upon changes of frequency of a local oscillator, which systems include a switching transistor responsive to such changes.

It is another object of the invention to provide signalling, alarm or warning systems predicated upon changes of frequency of a local oscillator wherein a second oscillator supplying a constant frequency standard is dispensed with.

Still another object of the invention is to provide a signalling, alarm or warning system comprising a diode bridge normally in balance, and a local oscillator normally oscillating at a predetermined fixed frequency and adapted to unbalance said diode bridge upon a change of said frequency.

A further object of the invention is to provide a signalling, alarm or warning system of the aforementioned character wherein said diode bridge controls a switching transistor which, in turn, controls an electromagnetic relay for switching the circuit forming the last stage of the protective circuitry.

Other objects and advantages of the invention will, in part, be obvious and in part appear hereinafter.

For a more complete understanding of the invention reference may be had to the following detailed description thereof taken in connection with the accompanying drawings wherein:

FIG. 2 is a block diagram of a modified version of the circuitry of FIG. 1 wherein the second frequency-standard-forming local oscillator is dispensed with;

Figure 1:
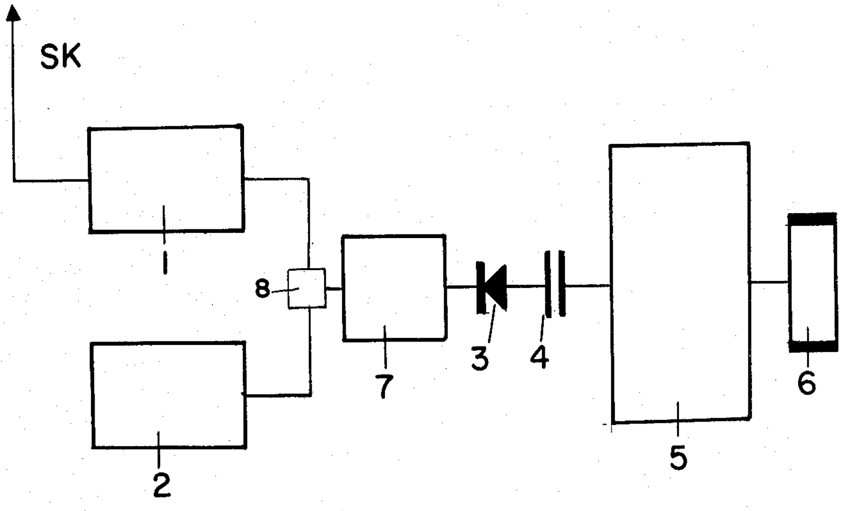
FIG. 1 is a block diagram of a first embodiment of the invention comprising a first local oscillator for energizing a sensing circuit and a second local oscillator whose frequency is fixed and which forms a frequency standard.
Figure 3:
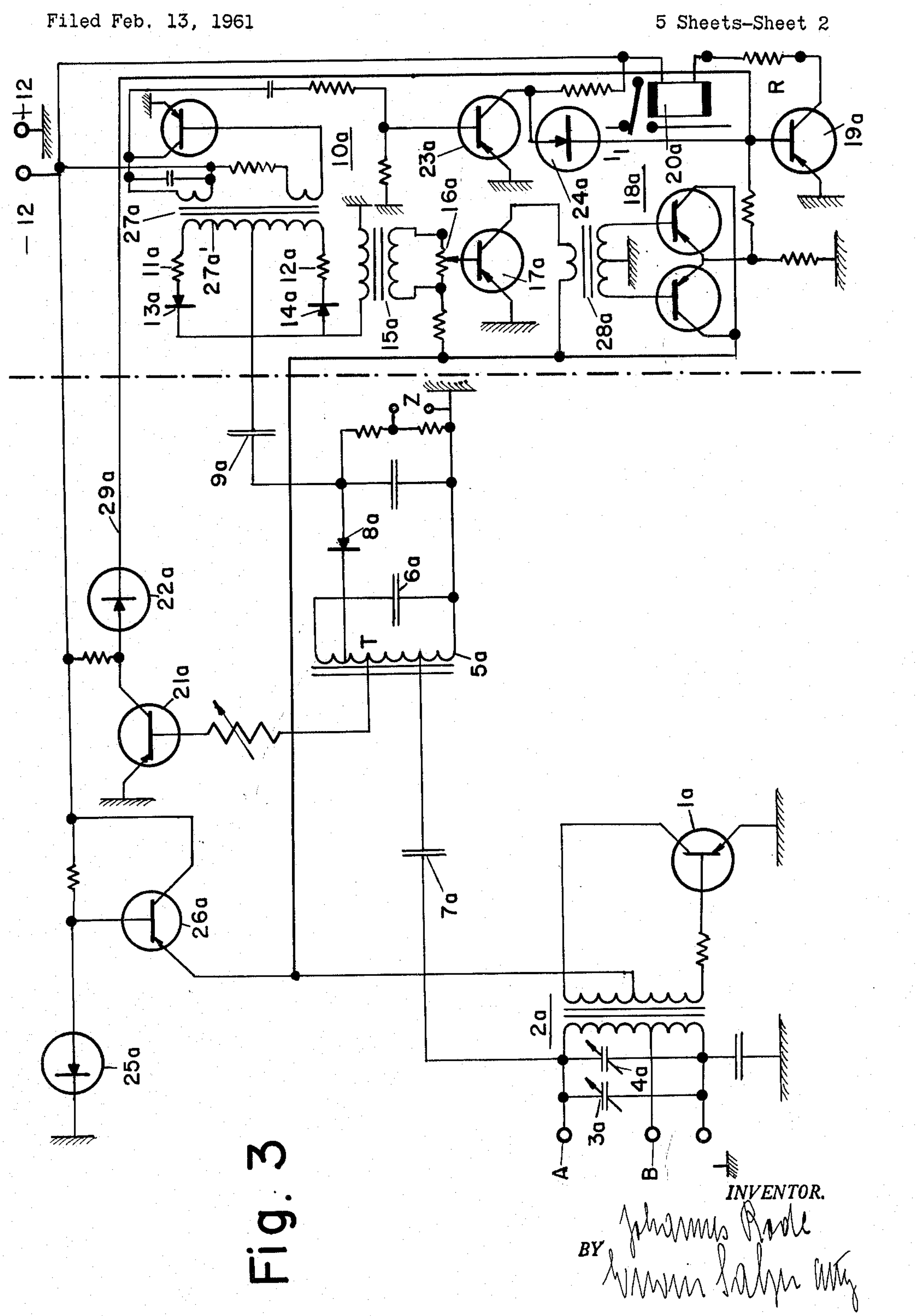
FIG. 3 is a more complete circuit diagram of the arrangement of FIG. 2.
Figure 3A:
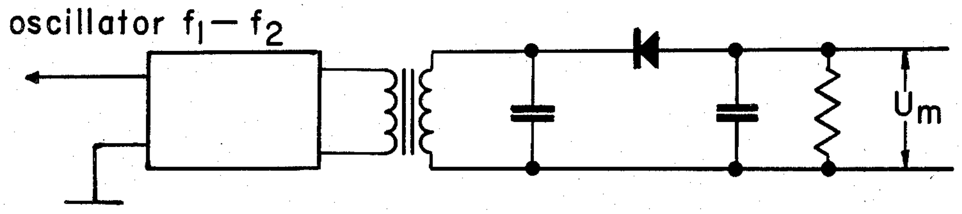
Figure 3B:
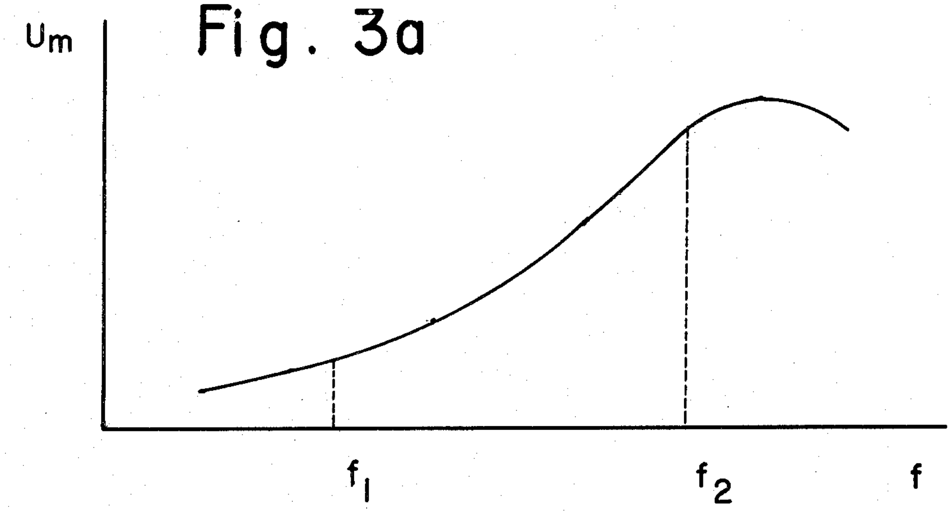
Figure 3C:
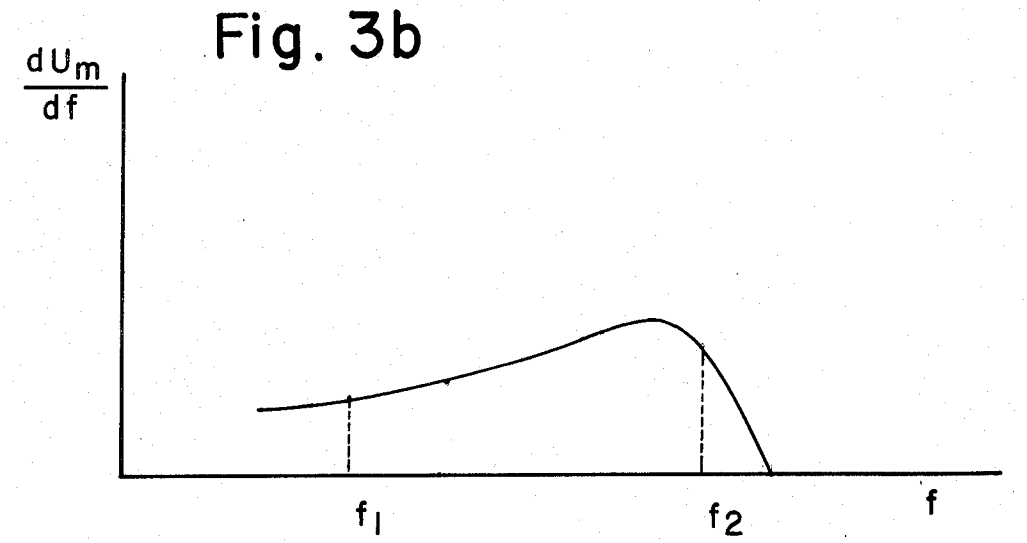
Figure 4:
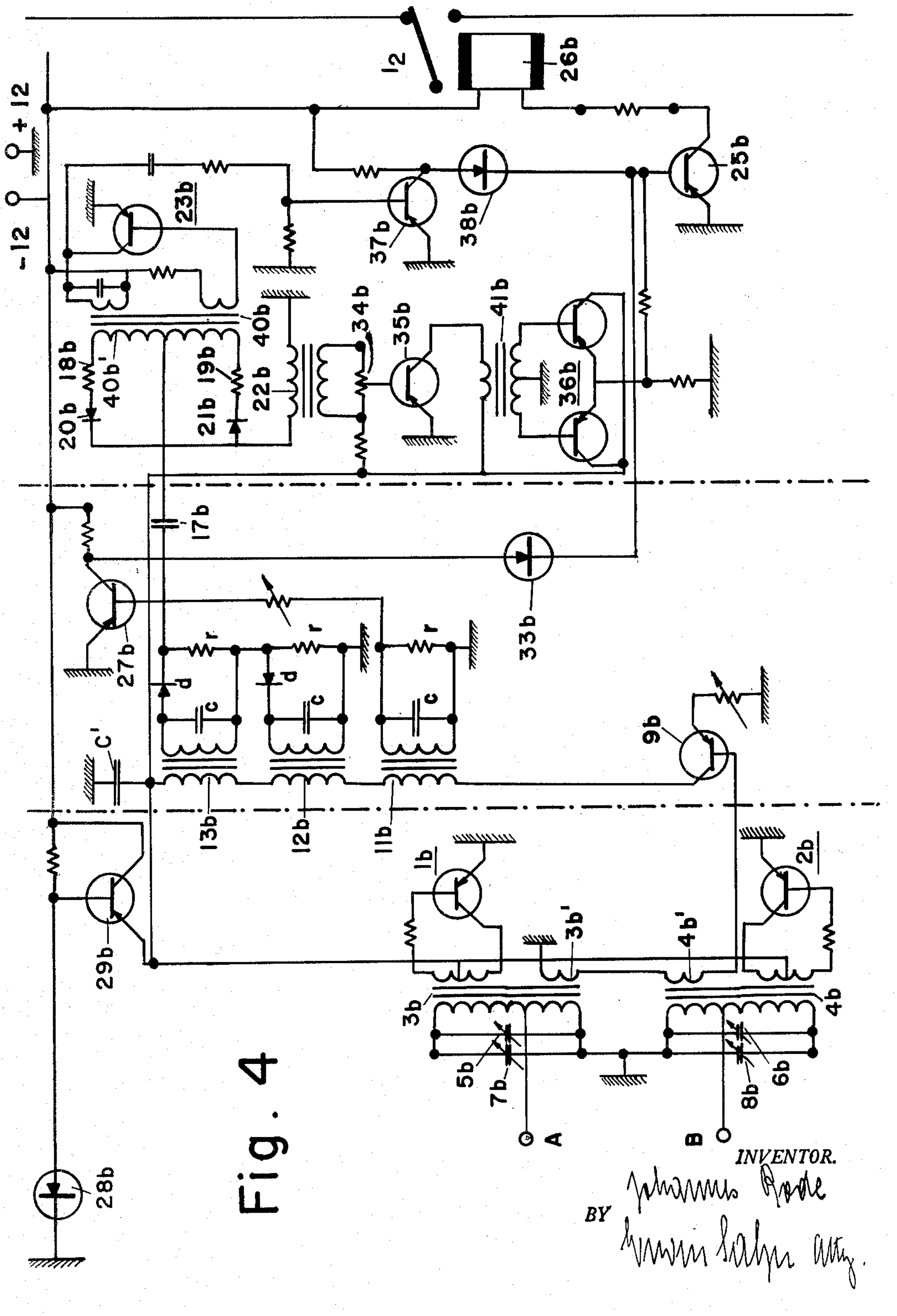
Figures 4A, 4B, 4C:
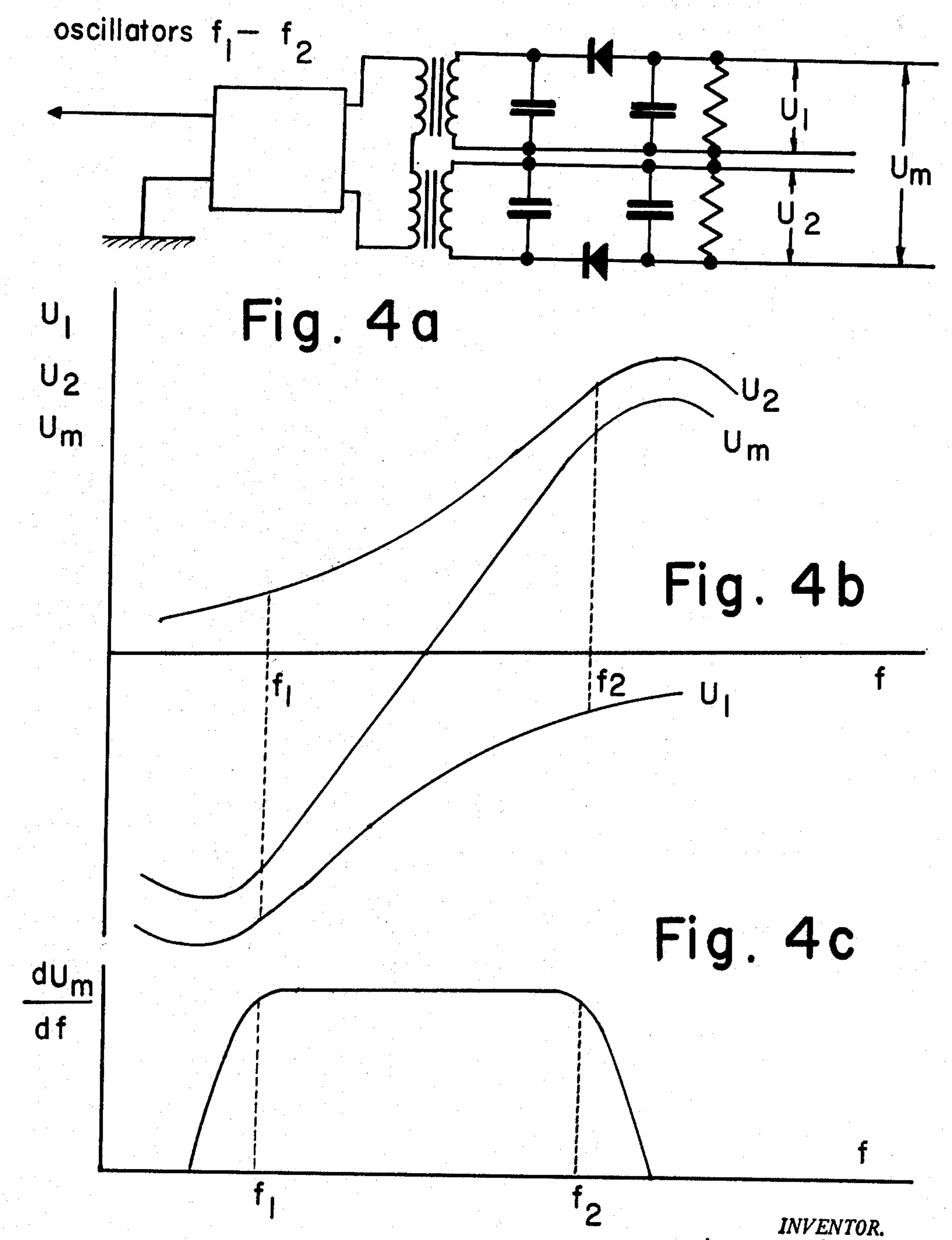

FIG. 3*a* is a simplified diagram showing the equivalent of the circuitry of FIG. 3;

FIG. 3*b* shows the output voltage plotted against frequency for the circuitry of FIGS. 3 and 3*a*;

FIG. 3*c* shows the first derivative of the curve of FIG. 3*b*;

FIG. 4 is a more complete circuit diagram of the arrangement of FIG. 1;

FIG. 4*a* is a simplified diagram showing the equivalent of the circuitry of FIG. 4;

FIG. 4*b* shows the output voltage plotted against frequency of the circuitry of FIGS. 4 and 4*a* and further shows two components of the aforementioned output voltage plotted against frequency; and FIG. 4*c* shows the first derivative of the output voltage curve of FIG. 4*b*.

Referring now to FIG. 1, numeral 1 has been applied to indicate a first local oscillator having a sensing circuit or protective circuit SK in an area or zone intended to be protected, e.g. against trespassers, burglars or other improper intruders, and numeral 2 has been applied to indicate a second local oscillator tuned at a frequency differing from that of oscillator 1, and serving as a frequency standard. If the frequency of oscillator 1 is changed, the frequency of beats formed by the oscillations of oscillators 1, 2 in a mixer 8 is changed accordingly. These beats are supplied to a demodulator or a discriminator 7 to be described below more in detail, are rectified in a rectifier indicated by the reference character 3, and are then used to control an RC circuit 4, 5. This RC circuit which is described below in detail comprises capacitor 4 and a diode-resistor bridge. It forms part of the semi-final stage of the system which includes a switching transistor operating the electromagnetic signal relay 6 which, in turn, controls the electric signal proper, e.g. a horn, a bell, a signalling light, etc.

Figure 2:
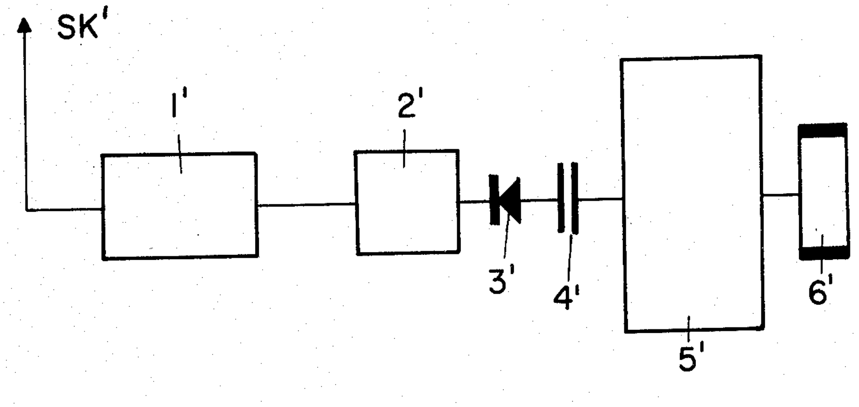

The modification of the invention illustrated in FIG. 2 comprises but one single local oscillator in the sensing or protective circuit SK' to which reference character 1' has been applied. Changes in the sensing circuit SK' cause changes of the frequency of oscillator 1'. The oscillations of oscillator 1' are supplied to the intermediary circuit 2' tuned to the natural frequency of oscillator 1'. The A.-C. voltage of circuit 2' is rectified in a rectifier 3', and then used to control an RC circuit 4', 5', comprising a capacitor 4' and a diode resistor bridge described below in detail. The RC circuit 4', 5' forms part of the semi-final stage of the system, including a switching transistor operating an electromagnetic signal relay 6' which, in turn, initiates the operation of an electric signal proper. In the circuitry of FIG. 2 a discriminator may be substituted for the intermediate circuit 2', as will be explained below more in detail.

The signalling or alarm system shown in FIG. 3 comprises an oscillator 1*a* formed by a transistor connected to generate oscillations. Oscillator 1*a* is included in the primary circuit of a transformer 2*a* and may be tuned to have a natural frequency in the order of 25 kilocycles. The capacitance for so tuning oscillator 1*a* comprises the two variable capacitors 3*a* and 4*a*, and the capacitance of the sensing circuit or protective circuit proper, not shown in FIG. 3, connected to the terminals A and B of FIG. 3. Reference characters 5*a*, 6*a* have been applied to indicate an intermediate oscillatory circuit including inductance 5*a* and capacitor 6*a*. The intermediate circuit 5*a*, 6*a* is coupled with oscillator 1*a* by means of capacitor 7*a*, and the oscillatory circuit 5*a*, 6*a* is fixedly tuned so as to have the same natural frequency as oscillator 1*a*, i.e. 25 kilocycles in the contemplated instance. The voltage prevailing in the intermediate circuit 5*a*, 6*a* is rectified by means of rectifier 8*a* and may be measured between a pair of terminals Z, to which a measuring system (not shown) may be connected. The indications of the measuring system connected to the pair of terminals Z may be used to tune oscillator 1*a* according to the intended operating frequency, e.g. 25 kilocycles, which may be achieved by properly adjusting capacitors 3*a* and 4*a*.

The D.-C. voltage obtained by rectifying the A.-C. voltage in the intermediate circuit 5*a*, 6*a* is impressed upon the capacitor 9*a*, thus being charged according to the magnitude of that D.-C. voltage. While one terminal of capacitor 9*a* is conductively connected to rectifier 8*a*, the other terminal thereof is grounded by the intermediary of a diode bridge. The aforementioned diode bridge comprises a center tapped secondary winding 27*a'* of a transformer 27*a*, the two branches 11*a*, 13*a* and 12*a*, 14*a* and one of the windings—i.e. the primary winding—of transformer 15*a*. The above-referred to parallel branches of the diode bridge include the two semiconductor diodes 13*a*, 14*a* and the two resistors 11*a*, 12*a*. Transformer 27*a* has a pair of primary windings and the secondary winding 27*a'*. The above diode bridge and capacitor 9*a* form a CR circuit. Numeral 10*a* has been applied to generally indicate a local oscillator including a feedback—connected transistor to generate oscillations say, in the order of 250 c.p.s. The output of oscillator 10*a* is fed into the primary windings of the above referred-to transformer 27*a*. A center tap of the secondary winding 27*a'* of transformer 27*a* is connected to capacitor 9*a*. Normally the diode bridge 11*a*, 12*a*, 13*a*, 14*a*, 27*a* is in balance, i.e. there is no current flow in its diagonal connection including the primary winding of transformer 15*a*. The circuit of the secondary winding of transformer 15*a* includes a regulating resistor 16*a*. Resistor 16*a* is connected to the base of transistor 17*a* and the voltage across resistor 16*a* controls the flow of current in transistor 17*a*, i.e. the flow of current through the emitter-collector circuit thereof. The latter includes the primary winding of a transformer 28*a* whose secondary circuit comprises push-pull amplifier 18*a*, made up by a pair of transistors in push-pull connection. The output of amplifier 18*a* is supplied to a switching transistor 19*a* whose emitter-collector circuit includes the electromagnetic relay 20*a*. The latter comprises a set of contacts $I_1$ for controlling the circuit of a warning signal (not shown) which may be of an acoustical or of an optical nature. The emitter-collector circuit of switching transistor 19*a* includes also the resistor R.

Reference character T has been applied to indicate a tap on inductance coil 5*a* of intermediate circuit 5*a*, 6*a*. Tap T is conductively connected to the base of transistor 21*a*. The emitter-collector circuit of transistor 21*a* includes the semiconductor diode 22*a* which, in turn, is connected by conductor 29*a* to the base of the aforementioned switching transistor 19*a*.

Reference character 23*a* has been applied to indicate an auxiliary transistor whose base is connected to, and who is under the control of, local oscillator 10*a*. Diode 24*a* connects the emitter-collector circuit of auxiliary transistor 23*a* to the base of switching transistor 19*a*.

The voltage required for the operation of local oscillator 1*a* and that of other stages of the circuitry of FIG. 3 is stabilized by zener or breakdown diode 25*a* which is connected to the base of transistor 26*a* to increase the output thereof.

The operation of the circuitry which has been described above is as follows:

The operation of the warning signal is initiated by a capacitive disturbance of the sensing circuit or protective circuit (not shown) connected to terminals A and B. Such a disturbance may be caused, for instance, by an act of burglary. If such a disturbance occurs it causes a change of the natural frequency of oscillator 1*a*. This change in frequency causes a change of the voltage in the intermediate circuit 5*a*, 6*a* and, therefore, also a change of the D.-C. voltage prevailing across capacitor 9*a*. As a result of the change from the initial voltage prevailing across capacitor 9*a* to some other voltage a transient current is caused to flow through the aforementioned diode bridge 11*a*, 12*a*, 13*a*, 14*a*, 27*a* and the primary winding of transformer 15*a*. Such a transient upsets the initial balance of the diode bridge, i.e. an A.-C. current is now allowed to flow in it. This A.-C. current energizes the transformer 15*a* and controls by the intermediary of regulator resistor 16*a* the current flow in transistor 17*a*. The signal current of transistor 17*a* is fed for amplification into transformer 28*a* and transistor push-pull amplifier 18*a*. The output of the latter is fed to on-off switching transistor 19*a* whose emitter-collector circuit includes the electromagnetic relay 20*a*. The latter, when energized, causes actuation of the signal proper, e.g. the emission of sound, light, etc.

When the capacitive disturbance of the sensing circuit or protective circuit connected to terminals A, B ceases to exist, and the flow of the transient current or equalizing current of capacitor 9*a* upsetting the balance of diode bridge 11*a*, 12*a*, 13*a*, 14*a*, 27*a* ceases, the control voltage previously prevailing in the last stages of the system disappears. Hence transformer 28*a* and push-pull amplifier 18*a* are de-energized, there is no longer any current flow in the emitter-collector circuit of switching transistor 19*a* and the electromagnetic relay 20*a* is de-energized.

The aforementioned sequence of steps may be considered as a dynamic energization of relay 20*a* by the intermediary of the RC circuit 9*a*, 11*a*, 12*a*. Switching transistor 19*a* may also be caused by another mechanism to energize relay 20*a*. This occurs when a major permanent capacitive disturbance occurs in the protective circuit connected to terminals A, B causing a drastic drop of the voltage in the intermediary circuit 5*a*, 6*a* to, say, somewhat less than ⅓ of its initial peak value. Under such circumstances the voltage at tap T of inductance coil 5*a* will drop accordingly. This, in turn, causes blocking of transistor 21*a* and a concomitant increase of its collector voltage. As a result, switching transistor 19*a* is being opened by the intermediary of diode 22*a*. In this instance relay 20*a* remains permanently energized. Disconnecting of a portion of the aforementioned protective circuit or sensing circuit preparatory to an act of burglary will cause such a permanent energization of relay 20*a*.

Transistor 23*a* is an automatic checking device supervising the proper operation of the auxiliary local oscillator 10*a*. If the A.-C. voltage supplied by oscillator 10*a* to checking transistor 23*a* drops drastically, checking transistor 23*a* operates substantially in the same fashion as transistor 21*a*. In other words, the collector current of transistor 23*a* ceases to flow and the increased collector voltage causes by the intermediary of diode 24*a* opening of switching transistor 19*a* and energization of relay 20*a*.

Referring now to FIGS. 3*a*–3*c*, the frequency of the local oscillator may vary between limit values as a result of the change of the capacitance in the protective circuit. These limit values may be designated as $f_1$ and $f_2$. FIG.

3*b* shows the peak voltage $U_m$ of the local oscillator plotted against the frequency thereof. The rate of rise of peak voltage between the limits $f_1$ and $f_2$ is non-linear. As long as the rate of change of frequency between the limits $f_1$ and $f_2$ is relatively slow, the alarm (relay 20*a* of FIG. 3) will not respond. Slow changes of the frequency of the local oscillator change the point of operation and hence the sensitivity of the devices whose operation depends upon the rate of rise of the characteristic of FIG. 3*b*. The rate of rise $$\frac{dU_m}{df}$$

of that characteristic has been plotted in FIG. 3*c* against frequency *f*.

The circuitry of FIG. 3 comprises several stages. The last stages have been separated from the earlier stages by a vertical dash-and-dot line.

The circuitry of FIG. 4 comprises three units which have been separated by two vertical dash-and-dot lines. The unit to the left of FIG. 4 is a beat unit made up of two local transistor generators. The unit in the center of FIG. 4 is substantially a demodulator unit and the unit at the right of FIG. 4 is identical to the unit shown on the right of FIG. 3.

Referring now more specifically to FIG. 4, numerals 1*b* and 2*b* have been applied to generally indicate two transistor generators. Generator 1*a* energizes transformer 3*b* and generator 2*b* energizes transformer 4*b*. Each of the two above mentioned transformers 3*b*, 4*b* comprises, in addition to a primary winding and a secondary winding, a tertiary winding. The aforementioned tertiary windings of transformers 3*b* and 4*b* have been indicated by reference characters 3*b'* and 4*b'*, respectively. The secondary windings of transformers 3*b* and 4*b* are connected to variable capacitors 5*b*, 7*b* and 6*b*, 8*b*, respectively, intended for tuning oscillators 1*b* and 2*b*. The secondary windings of transformers 3*b*, 4*b* are tapped and the respective taps connected to terminals A and B. Terminals A and B are intended to connect a sensing circuit or protective circuit into the circuit of oscillators 1*b*, 2*b*. Oscillators 1*b*, 2*b* may be tuned to generate oscillations having frequencies in the order of 25 kilocycles. The difference in frequency between oscillators 1*b* and 2*b* may be in the order of 1200 c.p.s. The above frequencies are mainly determined by the distributed capacitance of the sensing circuit or protective circuit connected to terminals A and B, and by the adjustment of variable capacitors 5*b*, 7*b*, 6*b*, 8*b*. The tertiary windings 3*b'*, 4*b'* of transformers 3*b*, 4*b* are serially connected and connected to the base of a transistor 9*b*. The emitter-collector circuit of mixing transistor 9*b* carries currents having the frequencies of oscillators 1*b*, 2*b* and frequencies equal to the sum of, and to the difference between, the frequencies of oscillators 1*b*, 2*b*.

The emitter-collector circuit of transistor 9*b* includes the serially connected primary windings of two transformers 12*b*, 13*b*. The secondary circuits of transformers 12*b*, 13*b* include fixed resistors *r*, fixed capacitors *c* and rectifier cells *d*. The primary winding of transformer 13*b* is grounded by the intermediary of capacitor C'. Both resistors *r* are connected in series. The upper resistor *r* is conductively connected to capacitor 17*b* and the lower resistor is grounded. Transformers 12*b*, 13*b* and the parts associated with the secondary circuits thereof, including capacitor 17*b*, form a demodulator as will be explained below more in detail.

A third transformer 11*b* having a primary winding included in the emitter collector circuit of mixing transistor 9*b* has a secondary winding connected to the base of transistor 27*b*.

All the parts and the circuitry shown to the right of FIG. 4 are identical to the parts and to the circuitry shown to the right of FIG. 3. Therefore the parts shown to the right of FIG. 4 and the operation thereof do not need to be described in detail. There are also some parts to the left of FIG. 4 and in the center portion of FIG. 4 which form counterparts of elements shown in FIG. 3 and described in connection with that figure, and which therefore, likewise need not to be described in connection with FIG. 4. The following table indicates corresponding parts in FIGS. 3 and 4.

| Fig. 3 | Fig. 4 |
|---|---|
| 25*a* | 28*b* |
| 26*a* | 29*b* |
| 21*a* | 27*b* |
| 22*a* | 33*b* |
| 13*a* | 20*b* |
| 14*a* | 21*b* |
| 11*a* | 18*b* |
| 12*a* | 19*b* |
| 10*a* | 23*b* |
| 27*a* | 40*b* |
| 27*a'* | 40*b'* |
| 15*a* | 22*b* |
| 16*a* | 34*b* |
| 17*a* | 35*b* |
| 28*a* | 41*b* |
| 18*a* | 36*b* |
| 23*a* | 37*b* |
| 24*a* | 38*b* |
| 19*a* | 25*b* |
| 20*a* | 26*b* |
| $I_1$ | $I_2$ |

The object of the above referred-to demodulator is to convert changes in frequency resulting from changes of the capacitance of the sensing circuit or protective circuit connected to terminals A, B into D.-C. impulses. The secondary circuits of transformers 12*a*, 13*a* are out of tune, or tuned to different frequencies, and the D.-C. voltages across resistors *r* are of opposite direction. The D.-C. voltage across both resistors *r* is the algebraic sum of the voltage across each of the resistors *r*. This total voltage is impressed upon capacitor 17*b*. The demodulator of FIG. 4 achieves a range of operation wherein the relation between changes of the capacitance of the sensing circuit or protective circuit and the D.-C. voltage yielded by the demodulator is substantially linear.

A change of the capacitance of the sensing circuit or protective circuit causes a corresponding change of the frequency of one of the local oscillators 1*b*, 2*b*, the frequency of the other of these two oscillators remaining unchanged. The difference between the frequencies of the two oscillators changes likewise. As a result, the voltage across the two resistances *r* of the above referred-to demodulator is changed and so is the voltage across capacitor 17*b*. As a result the balance of the diode bridge comprising the circuit elements 18*b*, 20*b*, 19*b*, 21*b*, 40*b'* and the primary winding of transformer 22*b* is upset and switching transistor 25*b* is closed by the operation of transistor 35*b* and transistor push-pull amplifier 36*b*. This causes energization of electromagnetic relay 26*b*.

It will be apparent that the diode bridge of FIG. 4 including the circuit elements 18*b*, 20*b*, 19*b*, 21*b* 40*b'* and the primary of transformer 22*b* corresponds to the diode bridge of FIG. 3 including the circuit elements 11*a*, 13*a*, 12*a*, 14*a*, 27*a* and the primary of transformer 15*a*, circuit elements 18*b*, 19*b* being ohmic resistors and circuit elements 20*b*, 21*b* being solid state diodes.

A large permanent change of the capacitance of the sensing circuit or protective circuit causes a drop of the voltage across the secondary winding of transformer 11*b* and blocking of transistor 27*b*. The ensuing increase of the collector voltage of transistor 27*b* is applied by the intermediary of diode 33*b* to the base of switching transistor 25*b* and causes the latter to open, thus resulting in a permanent energization of electromagnetic relay 26*b*.

FIGS. 4*a*–4*c* explain more completely the operation of the demodulator circuitry of FIG. 4. The latter figure includes, as will be remembered, two local oscillators 1*b*, 2*b* of which each is tuned to a different frequency. These frequencies are selected in such a way that the algebraic addition of the two voltages having these frequencies yields a straight line characteristic—or one closely approximating such a characteristic—between predeterminable frequency limits $f_1$ and $f_2$. FIG. 4a indicates the points of the circuit between which the components $U_1$ and $U_2$ of the aggregate voltage $U_m$ prevail as well as the points of the circuit between the aggregate voltage $U_m$ prevails. The voltages $U_1$, $U_2$ and $U_m$ are plotted in FIG. 4b against frequency and it is readily apparent from that figure that there is a range between the frequencies $f_1$ and $f_2$ wherein the voltage $U_m$ changes substantially linearly. Therefore the first derivative $$\frac{dU_m}{df}$$

of the voltage $U_m$ between the frequency limits $f_1$, $f_2$ is a line parallel to the axis of abscissae, as shown in FIG. 4c. The rate of rise of the voltage $U_m$ determines the sensitivity of the alarm or signalling system and this rate of rise can be predetermined to suit any particular need or requirement.

The application of the demodulator circuitry shown in FIGS. 4 and 4a is not limited to signalling devices having two local oscillators associated with the sensing circuitry, or protective circuitry, thereof, such as oscillators 1, 2 of FIG. 1, or oscillators 1b, 2b of FIG. 4. The demodulator circuitry shown in FIGS. 4 and 4a is also applicable to signalling devices having but one local oscillator associated with the sensing circuitry, or protective circuitry, thereof, such as oscillator 1' of FIG. 2 or oscillator 1a of FIG. 3.

In the circuitry of FIGS. 1, 4 and 4a, involving two local oscillators associated with the sensing or protective circuitry of the system, the difference between the frequencies $f_1$, $f_2$ of the two oscillators—which is the range within which the demodulator operates—will be a relatively low frequency. This is clearly apparent from the numerical example for that order of frequencies which has been given above.

If it is intended to apply the demodulator circuitry of FIG. 4 involving two circuits tuned to two different natural frequencies in a system of the type shown in FIG. 3 having but one single local oscillator 1a associated with the sensing or protective circuitry thereof, the demodulator takes the place of the oscillatory and rectifier circuit 5a, 6a and 8a of FIG. 3. In such an arrangement the frequencies at which the demodulator operates and the frequencies at which the local oscillator in the sensing or protective circuit operates are relatively high frequencies; but basically the same demodulator means are applicable irrespective of the particular arrangement of parts in the sensing or protective circuit.

It will be apparent from the foregoing that signalling and alarm systems embodying my invention include a local oscillator means having a sensing or protective circuit causing upon disturbance thereof a change of the frequency of said local oscillator means. Such systems further comprise means for establishing D.-C. currents dependent upon said change in frequency. The aforementioned D.-C. current establishing means comprise a CR circuit, i.e., a circuit including capacitance and ohmic resistance wherein the inductance is relatively small or negligible in comparison with the amount of capacitance and ohmic resistance therein. The aforementioned CR circuit includes a diode bridge comprising a bridge transformer having a primary winding and a secondary winding and a pair of diodes. The aforementioned diode bridge is inserted into the CR circuit between two points thereof, one of said points being a center tap on the secondary winding of the bridge transformer and the other of said points being situated between said pair of diodes. The diode bridge is normally balanced to preclude upon energization of the bridge transformer by an A.-C. current the flow of current in the secondary winding of the bridge transformer. The primary winding of the bridge transformer is fed by an A.-C. source, e.g. another local oscillator. The circuitry further comprises switching means responsive to A.-C. currents introduced by the bridge transformer into the CR circuit upon occurrence of an unbalance of said diode bridge as a result of the flow of a D.-C. current therein.

It will be understood that I have illustrated and described herein preferred embodiments only of the invention and that various alterations may be made in the details thereof without departing from the spirit and scope of the invention as defined in the appended claims.

I claim as my invention:

1. A signalling and alarm system comprising local oscillator means including a sensing circuit causing upon disturbance thereof a change of the frequency of said local oscillator means; means for establishing D.-C. currents dependent upon said change in frequency, said D.-C. current establishing means including a CR circuit, the capacitance of said CR circuit being formed by a capacitor and the ohmic resistance of said CR circuit being formed by a diode bridge including a secondary transformer winding having a center tap connected to said capacitor, said bridge further having a pair of parallel branches each connected to one end of said secondary winding and each including an ohmic resistor and a diode; a primary transformer winding cooperatively related to said secondary transformer winding; an A.-C. source feeding said primary transformer winding; and switching means under the control of the voltage prevailing at the ends of said parallel branches remote from said secondary winding responsive to A.-C. currents introduced into said CR circuit as a result of the flow of said D.-C. currents therein.

2. A signalling and alarm system as specified in claim 1 wherein said switching means include a switching transistor and an electro-magnetic relay under the control of said switching transistor.

3. A signalling and alarm system comprising local oscillator means including a sensing circuit causing upon disturbance thereof a change of the frequency of said local oscillator means; means for establishing D.-C. currents dependent upon said change in frequency, said D.-C. current establishing means including a CR circuit, the capacitance of said CR circuit being formed by a capacitor and the ohmic resistance of said CR circuit being formed by a diode bridge including a secondary transformer winding having a center tap connected to said capacitor, said bridge further having a pair of parallel branches each connected to one end of said secondary transformer winding and each including an ohmic resistor and a diode; a primary transformer winding operatively related to said secondary transformer winding, said bridge being normally balanced to preclude upon energization of said primary winding by an A.-C. current the flow of current in said secondary winding; an A.-C. source feeding said primary winding; and switching means responsive to A.-C. currents introduced by said primary winding into said CR circuit upon occurrence of an unbalance of said bridge as a result of the flow of said D.-C. current therein.

4. A signalling and alarm system as specified in claim 3 comprising a second transformer energized by said A.-C. currents in said CR circuit.

5. A signalling and alarm system comprising local oscillator means including a sensing circuit causing upon disturbance thereof a change of the frequency of said local oscillator means; means for establishing D.-C. currents dependent upon said change in frequency, said D.-C. current establishing means including a CR circuit, the capacitance of said CR circuit being formed by a capacitor and the ohmic resistance of said CR circuit being formed by a diode bridge including a secondary transformer winding having a center tap connected to said capacitor, said bridge further having a pair of parallel branches each connected to one end of said secondary transformer winding and each including an ohmic resistor and a diode; a primary transformer winding operatively related to said secondary transformer winding;

an A.-C. source feeding said primary transformer winding; and switching means responsive to A.-C. currents introduced by said primary transformer winding into said CR circuit as a result of the flow of said D.-C. currents therein, said switching means including a switching transformer having a primary winding and a secondary winding and a transistor, said primary winding of said switching transformer being energized by said A.-C. currents and the currents flowing in said secondary winding of said switching transformer controlling said transistor.

6. A signalling and alarm system comprising local oscillator means including a sensing circuit causing upon disturbance thereof a change of the frequency of said local oscillator means; means for establishing D.-C. currents dependent upon said change in frequency, said D.-C. current establishing means including an oscillatory circuit energized by said local oscillator means, rectifier means for rectifying currents in said oscillatory circuit and a CR circuit energized by currents rectified by said rectifier means; a diode bridge included in said CR circuit, said bridge including a secondary transformer winding having a center tap and said bridge further including a pair of parallel branches each connected to one end of said secondary winding and each including an ohmic resistor and a diode; a primary transformer winding operatively related to said secondary transformer winding; said bridge being normally balanced to preclude upon energization of said primary transformer winding by an A.-C. current the flow of current in said secondary transformer winding; an A.-C. source feeding said primary transformer winding; and switching means responsive to A.-C. currents introduced by said primary transformer winding into said CR circuit upon occurrence of an unbalance of said bridge as a result of the flow of said D.-C. currents therein.

7. A signalling and alarm system comprising local oscillator means including a sensing circuit causing upon disturbance thereof a change of the frequency of said local oscillator means; means for establishing D.-C. currents dependent upon said change in frequency, said D.-C. current establishing means including a pair of oscillatory circuits having different natural frequencies each energized by said local oscillator means, a pair of rectifier means each for rectifying currents in one of said pair of oscillatory circuits, means for algebraically adding the rectified voltages in each of said oscillatory circuits, and a CR circuit energized by currents resulting from the aggregate voltage obtained by said algebraic addition, the capacitance of said CR circuit being formed by a capacitor and the ohmic resistance of said CR circuit being formed by a diode bridge including a secondary transformer winding having a center tap connected to said capacitor, said bridge further having a pair of parallel branches each connected to one end of said secondary transformer winding and each including an ohmic resistor and a diode; a primary transformer winding operatively related to said secondary transformer winding, said bridge being normally balanced to preclude upon energization of said primary transformer winding by an A.-C. current the flow of current in said secondary transformer winding; an A.-C. source feeding said primary transformer winding; and switching means responsive to A.-C. currents introduced by said primary transformer winding into said CR circuit upon occurrence of an unbalance of said bridge as a result of the flow of said D.-C. currents therein.

8. A signalling and alarm system comprising a first local oscillator including a sensing circuit causing upon disturbance thereof a change of the frequency of said first local oscillator; a second local oscillator; a mixer circuit for mixing the oscillations of said first oscillator and the oscillations of said second oscillator; a rectifier for rectifying a current derived from said mixer circuit; a CR circuit energized by D.-C. currents resulting from the operation of said rectifier; a diode bridge included in said CR circuit, said bridge including a secondary transformer winding having a center tap and a pair of parallel branches each connected to one end of said secondary transformer winding and each including an ohmic resistor and a diode; a primary transformer winding operatively related to said secondary transformer winding; said bridge being normally balanced to preclude upon energization of said primary transformer winding by an A.C. current the flow of current in said secondary transformer winding; an A.-C. source feeding said primary transformer winding; and switching means responsive to A.-C. currents introduced by said primary transformer winding into said CR circuit upon occurrence of an unbalance of said bridge as a result of the flow of said D.-C. currents therein.

9. A signalling and alarm system comprising local oscillator means including a sensing circuit causing upon disturbance thereof a change of the frequency of said local oscillator means; a CR circuit; a means for producing D.-C. currents for energizing said CR circuit, said D.-C. current producing means being adapted to produce D.-C. currents proportional in magnitude to the rate of change of said frequency of said local oscillator means; a diode bridge included in said CR circuits, said bridge including a secondary transformer winding having a center tap and a pair of parallel branches each connected to one end of said secondary transformer winding and each including on ohmic resistor and a diode; a primary transformer winding operatively related to said secondary transformer winding; said bridge being normally balanced to preclude upon energization of said primary transformer winding by an A.-C. current the flow of current in said secondary transformer winding; an A.-C. source feeding said primary transformer winding; switching means responsive to A.-C. currents introduced by said primary transformer winding into said CR circuit upon occurrence of an unbalance of said bridge as a result of the flow of said D.-C. currents therein, and additional means for causing operation of said switching means upon occurrence of a predetermined change of said frequency of said local oscillator means irrespective of the rate at which said change occurs.

10. A signalling and alarm system as specified in claim 9 wherein said additional means include a transistor under the control of said local oscillator means, said transistor having an emitter collector circuit, said emitter-collector circuit including a diode allowing the passage of current upon a predetermined rise of the voltage across said diode.

References Cited in the file of this patent

UNITED STATES PATENTS 2,851,613 Welker ---------------- Sept. 9, 1958